United States Patent
Ozawa

(12) 
(10) Patent No.: US 6,765,066 B2
(45) Date of Patent: Jul. 20, 2004

(54) COPOLYMERS PREPARED BY USING BOTH ANIONIC POLYMERIZATION TECHNIQUES AND COORDINATION CATALYSTS

(75) Inventor: Yoichi Ozawa, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 8 days.

(21) Appl. No.: 10/169,390

(22) PCT Filed: Dec. 29, 2000

(86) PCT No.: PCT/US00/35569

§ 371 (c)(1),
(2), (4) Date: Jun. 28, 2002

(87) PCT Pub. No.: WO01/49764

PCT Pub. Date: Jul. 12, 2001

(65) Prior Publication Data

US 2003/0088029 A1 May 8, 2003

Related U.S. Application Data

(60) Provisional application No. 60/173,698, filed on Dec. 30, 1999.

(51) Int. Cl.[7] ................... C08F 295/00; C08F 297/02; C08F 297/06; C08F 4/08; C08L 53/00
(52) U.S. Cl. ................ 525/314; 525/271; 525/249; 525/250; 525/313; 525/316
(58) Field of Search ................. 525/314, 271, 525/249, 250, 313, 316

(56) References Cited

U.S. PATENT DOCUMENTS

| | | | |
|---|---|---|---|
| 3,489,823 A | 1/1970 | Naarmann et al. | 260/879 |
| 3,700,755 A | 10/1972 | Yamaguchi et al. | 260/879 |
| 3,794,604 A | * 2/1974 | Throckmorton | 525/314 |
| 5,514,753 A | 5/1996 | Ozawa et al. | 525/279 |
| 5,530,068 A | * 6/1996 | Coolbaugh et al. | 525/314 |
| 5,585,443 A | 12/1996 | Ozawa et al. | 525/314 |
| 5,589,549 A | 12/1996 | Govoni et al. | 525/247 |
| 6,075,095 A | 6/2000 | Fiedler et al. | 525/331.9 |

FOREIGN PATENT DOCUMENTS

| | | |
|---|---|---|
| EP | 0 034 235 | 8/1981 |
| EP | 0 083 190 | 6/1983 |
| GB | 821 971 | 10/1959 |

* cited by examiner

*Primary Examiner*—James J. Seidleck
*Assistant Examiner*—Olga Asinovsky
(74) *Attorney, Agent, or Firm*—Arthur Reginelli

(57) ABSTRACT

A process for forming a copolymer comprising the steps of (i) preparing a living polymer segment by using anionic polymerization techniques, (ii) modifying the living polymer by reacting it with an alkyl metal halide to form an organometallic polymeric intermediate, and (iii) preparing a second polymer segment from the organometallic polymeric intermediate by combining the intermediate, conjugated diene monomer, and a coordination catalyst that will polymerize the conjugated diene monomer.

20 Claims, No Drawings

COPOLYMERS PREPARED BY USING BOTH ANIONIC POLYMERIZATION TECHNIQUES AND COORDINATION CATALYSTS

This applicaton gains priority from International Application No. PCT/US00/35569, filed on Dec. 29, 2000, which gains priority from U.S. Provisional Patent Application No. 60/173,698, filed on Dec. 30, 1999.

TECHNICAL FIELD OF THE INVENTION

The present invention is generally directed toward a process for preparing a copolymer. The process includes forming a first segment of the copolymer by using anionic polymerization techniques and then forming a second segment by using coordination catalysts.

BACKGROUND OF THE INVENTION

Synthetically prepared conjugated diene polymers are commonly used in the rubber industry. These polymers are often prepared by using coordination-catalysts, which allow for control of the resulting microstructure. For example, polybutadiene having greater than 90 percent of its units in the 1,4-cis configuration can be produced with a coordination catalyst system that includes a nickel, cobalt, or titanium compound, an alkylating agent, and a halogen source. Polymers having this microstructure have a low glass transition temperature ($T_g$), which provides good low-temperature properties. Also, high 1,4-cis polymers have excellent wear resistance and mechanical properties such as reduced cut growth.

The tire industry has been challenged to design tires that have improved rolling resistance, which contributes to better fuel efficiency. Attempts thus far to address rolling resistance have included alternate tire designs and the use of rubber that has less hysteresis loss. In addressing the latter, the rubber industry has found that polymers that interact with tire fillers have demonstrated less hysteresis loss.

By using anionic polymerization techniques, polymers can be functionalized with filler-interactive groups both at initiation and termination. Unfortunately, however, anionic polymerization does not provide strict control over the polymer microstructure and therefore high 1,4-cis polymers are not obtained.

While many advantages can be attributed to anionically-polymerized polymers, and many others can be attributed to those polymers prepared with coordination catalysts, the combination of these advantages is highly desirable.

Unfortunately, however, the use of coordination catalysis has limited the ability to functionalize the resulting polymers. In the case of anionically-polymerized elastomers, the living nature of the resulting polymer allows for the addition of a modifying substituent by using simple chemical reactions such as nucleophilic substitution or addition reactions. In addition to end-functionalization, anionically-polymerized polymers can also be functionalized by using a functionalized initiator. But, since coordination catalysis operates by different chemical mechanisms that involve the interplay and interaction of several chemical constituents, and often also involves self-termination reactions, the chemistry and reaction conditions that are required to achieve funcitonalization are difficult to obtain.

Therefore, there is a need in the art to provide high-cis conjugated diene polymers, such as polybutadiene, that contain functional groups that will interact with or have an affinity toward carbon black and silica.

SUMMARY OF THE INVENTION

The present invention generally provides a process for forming a copolymer comprising the steps of (i) preparing a living polymer segment by using anionic polymerization techniques, (ii) modifying the living polymer by reacting it with an alkyl metal halide to form an organometallic polymeric intermediate, and (iii) preparing a second polymer segment from the organometallic polymeric intermediate by combining the intermediate, conjugated diene monomer, and a coordination catalyst that will polymerize the conjugated diene monomer.

The present invention also includes a copolymer prepared by the steps comprising (i) preparing a living polymer segment by using anionic polymerization techniques, (ii) modifying the living polymer by reacting it with an alkyl metal halide to form an organometallic polymeric intermediate, and (iii) preparing a second polymer segment from the organometallic polymeric intermediate by combining the intermediate, conjugated diene monomer, and a coordination catalyst that will polymerize the conjugated diene monomer.

The present invention further includes a tire comprising a copolymer prepared by (i) preparing a living polymer segment by using anionic polymerization techniques, (ii) modifying the living polymer by reacting it with an alkyl metal halide to form an organometallic polymeric intermediate, and (iii) preparing a second polymer segment from the organometallic polymeric intermediate by combining the intermediate, conjugated diene monomer, and a coordination catalyst that will polymerize the conjugated diene monomer.

DETAILED DESCRIPTION OF ILLUSTRATIVE EMBODIMENTS

The copolymer of this invention is formed by (i) preparing a first polymer segment by using anionic polymerization techniques, (ii) modifying this anionically-polymerized polymer with an alkyl metal halide compound, and then (iii) preparing a second polymer segment by using a coordination catalyst. The resulting copolymer may include a block copolymer or a graft copolymer. These copolymers may be linear or, especially in the case of a graft copolymer, they may include comb polymers. In the case of a comb polymer, the backbone of the comb is synthesized as the first segment via anionic polymerization techniques, and the branches extending from the backbone are synthesized via a coordination catalyst. The second polymer segment is preferably a high-cis conjugated diene polymer, such as high-cis polybutadiene. A high-cis polymer generally includes greater than 75%, more preferably greater than 85%, even more preferably greater than 95%, and even more preferably greater than 98% of its polymeric unites in the cis configuration.

Any anionic polymerization initiator can be used for preparing the first segment of the copolymer. The corresponding halide may include any halide, with chlorine, bromine, and fluorine being most preferred. These initiators include, but are not limited to, organolithium initiators such as butyllithium or functional initiators such as lithium amide initiators, aminoalkyl lithium initiators, and organotin lithium initiators. Exemplary initiators are described in U.S. Pat. Nos. 5,153,159, 5,268,439, 5,274,106, 5,238,893, 5,332,810, 5,329,005, 5,578,542, 5,393,721, 5,491,230, 5,521,309, 5,496,940, 5,574,109, 5,523,364, 5,527,753, and 5,550,203. These initiators are particularly useful for synthesizing conjugated diene elastomers or copolymers of conjugated diene monomers and vinyl-substituted aromatic monomers, although the present invention should not be limited to the formation of rubbery elastomers. Indeed, any monomer that can be anionically polymerized and not detrimentally affect the subsequent coordination polymerization of conjugated diene can be used. Some specific examples of suitable conjugated diene monomers include 1,3-butadiene, 2,3-dimethyl-1,3-buradiene, 2-phenyl-1,3-butadiene, isoprene, 1,3-pentadiene, 2-methyl-1,3-pentadiene, 2,3-dimethyl-1,3-pentadiene, and 4,5-diethyl-1,3-octadiene. Some specific examples of suitable vinyl-substituted aromatic monomers that can be polymerized into rubbery elastomers include styrene, 4-methylstyrene, α-methylstyrene, 3,5-diethylstyrene, 4-propylstyrene, 2,4,6-trimethylstyrene, 4-dodecylstyrene, 2,3,4,5-tetraethylstyrene, 3-methyl-5-normal-hexylstyrene, 4-phenylstyrene, 2-ethyl-4-benzylstyrene, 3,5-diphenylstyrene, 1-vinylnaphthalene, 3-ethyl-1-vinylnaphthalene, 6-isopropyl-1-vinylnaphlthalene, 6-cyclohexyl-1-vinylnaphthalene, 7-dodecyl-2-vinylnaphthalene, and the like, and mixtures thereof.

The living polymer prepared in the first step is then modified by reacting it with an alkyl metal halide. The alkyl metal halides that are used should (i) add to the living end of the living polymer, and (ii) form an organometallic polymeric intermediate that will transfer its polymeric ligand to the active coordination catalyst species. Preferably, the organometallic polymeric intermediate should not be an ATE complex, which is a compound bearing a negative charge such as an aluminum compound having a valance of 4.

The presence of organometallic compounds or species is often detrimental, especially in terms of the rate of polymerization activity, to a coordination catalyst system. In some cases, the presence of lithium salts in insoluble or semi-soluble form can also affect the rate of polymerization. Therefore, it is advantageous to use precise stoichiometry between the halogen of the alkyl metal halide and the metal, e.g., lithium, of the living polymer. Accordingly, the amount of alkyl metal halide cannot be given without reference to the amount of metal in the anionic polymerization initiator. In the case of a lithium-containing anionic polymerization initiator, the amount of alkyl metal halide employed should preferably correspond to 1 milliequivalent of halide per 1 milliequivalent of lithium. Preferably, this amount should not vary by more than about 10%, even more preferably by no more that 3%, even more preferably by no more than 1%. Further, it is advantageous to age the mixture of the alkyl metal halide and living polymer, and thereby precipitate the metal halide, e.g., lithium chloride, from the mixture. These metal salts, which after aging have a larger particle size, are less detrimental to the coordination catalyst polymerization in the following step. Accordingly, it is preferred to age the mixture of the alkyl metal halide and living polymer for at least about 12 hours, more preferably for at least 24 hours, and even more preferably for at least 36 hours.

Some useful alkyl metal halide compounds include, but are not limited to, those comprising aluminum, zinc, or tin. Alkyl aluminum halide compounds are most preferred. Suitable alkyl aluminum halides include dialkyl aluminum chlorides, dialkyl aluminum bromides, alkyl aluminum dichlorides, alkyl aluminum dibromides, alkyl aluminum sesquichloride, and alkyl aluminum sesquibromide. Non-limiting examples of dialkyl aluminum chlorides include dimethyl aluminum chloride, diethyl aluminum chloride, dipropyl aluminum chloride, diisopropyl aluminum chloride, dibutyl aluminum chloride, dioctyl aluminum chloride, dihexyl aluminum chloride, and diisobutyl aluminum chloride. Non-limiting examples of dialkyl aluminum bromides include dimethly aluminum bromide, diethyl aluminum bromide, dipropyl aluminum bromide, diisopropyl aluminum bromide, dibutyl aluminum bromide, dioctyl aluminum bromide, dihexyl aluminum bromide, and diisobutyl aluminum bromide. Non-limiting examples of alkyl aluminum dichlorides include methyl aluminum dichloride, ethyl aluminum dichloride, propyl aluminum dichloride, butyl aluminum dichloride, and isobutyl aluminum dichloride. Non-limiting examples of alkyl aluminum dibromides include methyl aluminum dibromide, ethyl aluminum dibromide, propyl aluminum dibromide, butly aluminum dibromide, and isobutyl aluminum dibromide. Non-limiting examples of alkyl sesquichlorides include ethyl aluminum sesquichloride and isobutyl aluminum sesquichloride. Non-limiting examples of alkyl sesquibromides include ethyl aluminum sesquibromide and isobutyl aluminum sesquibromide. Non-limiting examples of alkyl aluminum fluorides include those compounds represented by the formula $R_2AlF$, $RAlF_2$, or $R_3Al_2F_3$, where R represents an organic group such as, but not limited to, an alkyl group.

Once the first segment of the copolymer is prepared and reacted with an alkyl metal halide to form an intermediate species, the second segment of the copolymer is prepared by using coordination catalysis techniques. Any coordination catalyst can be employed to polymerize conjugated dienes and prepare the second segment. Suitable coordination catalysts include those based upon lanthanide metals such as cerium, lanthanum, neodymium and praseodymium, as well as those based upon cobalt, nickel, titanium and iron. The preferred lanthanide-based catalyst systems typically are formed by combining a lanthanide compound such as a neodymium compound, an alkylating agent, and a source of halogen. These lanthanide-based catalyst systems are particularly useful for polymerizing 1,3-butadiene monomer into cis-1,4-polybutadiene rubber. Exemplary lanthanide-based catalysts are described in U.S. Pat. Nos. 3,297,667, 3,541,063, 3,794,604, which are incorporated herein by reference. The lanthanide compound can include neodymium (Nd) carboxylates including Nd neodecanoate. Also, the lanthanide compound can include the reaction product of a Nd carboxylate and a Lewis base such as acetylacetone. The alkylating agents can generally be defined by the formula $AlR_3$, where each R, which may the same or different, is hydrogen, a hydrocarbyl group, or an alkyl aluminoxy group, with the proviso that at least one R is a hydrocarbyl group. Examples of these alkylating agents include, but are not limited to, trialkyl aluminum, dialkyl aluminum hydride, alkyl aluminum dihydride, and mixtures thereof. Examples of alkylating agents where R is an alkyl aluminoxy group include methyl aluminoxanes. Sources of halogen can include organoaluminum chloride compounds. Catalyst systems that generally include lanthanide compounds and alkylating agents definable by the formula $AlR_3$ are disclosed in U.S. Pat. Nos. 3,297,667, 3,541,063, and 3,794,604, which are incorporated herein by reference.

One particularly preferred catalyst includes (a) the reaction product of Nd carboxylate and acetylacetone, (b) triisobutylaluminum, diisobutylaluminum hydride, isobutylaluminum dihydride, or a mixture thereof, and (c) diethylaluminum chloride, ethylaluminum dichloride, or mixtures thereof. This catalyst system is disclosed in U.S. Pat. No. 4,461,883, which is incorporated herein by reference. Another preferred catalyst includes (a) Nd neodecanoate, (b) triisobutylaluminum, diisobutylaluminum hydride, isobutylaluminum dihydride, or a mixture thereof, and (c) diethylaluminum chloride, ethylaluminum dichloride, or mixtures thereof. This catalyst system is disclosed in Can. Pat. No. 1,223,396, which is incorporated herein by reference.

Still another preferred lanthanide-based catalyst system includes (a) a lanthanide compound such as Nd carboxylate, (b) an aluminoxane such as methyl aluminoxane, which may optionally be used in conjunction with an alkylating agent such as diisobutylaluminum hydride, and (c) a source of halogen such as diethylaluminum chloride. Neodymium catalysts that include alkyl aluminoxane compounds are described in Japanese Kokai publications 06-211916, 08-073515, 10-306113, and 11-035633, which are incorporated herein by reference. In an especially preferred embodiment of the system with aluminoxanes, the source of halogen is a metal halide of Group I, II, or VII metals. These metal halides include, but are not limited to, $BeCl_2$, $BeBr_2$, $BeI_2$, $MgCl_2$, $MgBr_2$, $MgI_2$, $CaCl_2$, $CaBr_2$, $CaI_2$, $BaCl_2$, $BaBr_2$, $BaI_2$, $ZnCl_2$, $ZnBr_2$, $ZnI_2$, $CdCl_2$, $HgCl_2$, $MnCl_2$, $ReCl_2$, $CuCl_2$, $AgCl_2$, $AuCl$. Other lanthanide-based catalysts and processes for their use are described in U.S. Pat. Nos. 4,444,903, 4,525,549, 4,699,960, 5,017,539, 5,428,119, 5,064,910, and 5,844,050, which are incorporated herein by reference.

Typically, from about 0.0001 to about 1.0 mmol of lanthanide metal are employed per 100 grams of monomer. More preferably, from about 0.001 to about 0.75, and even more preferably from about 0.005 to about 0.5 mmol of lanthanide metal per 100 grams of monomer are employed. The ratio of alkylating agent to lanthanide metal is from about 1:1 to about 1:500, more preferably from about 3:1 to about 250:1, and even more preferably from about 5:1 to about 200:1. The ratio of halogen source to lanthanide metal is from about 0.1:1 to about 30:1, more preferably from about 0.2:1 to about 15:1, and even more preferably from about 1:1 to about 10:1.

Monomers that are polymerized by the lanthanide-based catalysts are conjugated diene monomers that include, but are not limited to, 1,3-butadiene, isoprene, 1,3-pentadiene, 2,3-dimethyl-1,3-butadiene, and myrcene. 1,3-butadiene is most preferred. These conjugated dienes may be used either alone or in combination. If desired, a small amount of monomer other than conjugated dienes can be added. These other monomers include, but are not limited to, aromatic vinyl compounds such as styrene. The amount of the copolymerizable monomer is not limited, but is usually less than 10 percent by weight (pbw) preferably less than 5 pbw, and even more preferably less than about 3 pbw of the entire polymer.

Preferably, the coordination catalyst is formed before it is combined with the organometallic polymeric intermediate. For example, in the case of a lanthanide-based catalyst system, the lanthanide compound, the alkylating agent, and the source of halogen are combined within a solvent to form a mixture of active catalyst species. This mixture of active catalyst species is then combined with the organometallic polymeric intermediate to form the second segment of the copolymer.

Inasmuch as lanthanide-based catalyst systems lead to the formation of pseudo-living polymers, it is preferable to terminate the living nature of these polymers. As those skilled in the art will appreciate, any proton donor, such as water or an alcohol, can be used for this purpose. It is preferable, however, to use terminating agents that will provide some functionality to the tail-end of the copolymer. These functionalizing agents include a substituent that will undergo an addition reaction with a pseudo-living polymer, and a group that will react or interact with silica or carbon black reinforcing fillers. Substituents that will undergo an addition reaction with a pseudo-living polymer include epoxy, ester, imine including dihydroimidazole, isocyanate, isothiocyanate, ketone, and imide groups including isocyanulate groups. Groups that will react with or interact with silica or carbon black reinforcing fillers include silane groups, N,N-disubstituted amino phenyl groups, imine groups, and cyclic amino groups. Many of these functionalizing agents are described in co-pending provisional applications U.S. Ser. Nos. 60/165,169 and 60/165,172.

The copolymers of this invention can advantageously be used in the manufacture of various tire components including, but not limited to, tire treads, side walls, subtreads, and bead fillers. They can be used as all or part of the elastomeric component of a tire stock. In one embodiment, the copolymers comprise greater than about 10 pbw, more preferably, greater than about 20 pbw, and even more preferably greater than about 30 pbw, of the elastomeric component of a tire stock. Addition of the copolymers to a tire stock does not alter the type or amount of other ingredients typically included within these vulcanizable compositions of matter. Accordingly, practice of this invention is not limited to any particular vulcanizable composition of matter or tire compounding stock.

Typically, tire stocks include an elastomeric component or rubber that is blended with reinforcing fillers and at least one vulcanizing agent. Accelerators, oils, waxes, fatty acids and processing aids are often included. Vulcanizable compositions of matter containing synthetic rubbers typically include antidegradants, processing oils, zinc oxide, optional tackifying resins, optional reinforcing resins, optional peptizers, and optional scorch inhibiting agents.

The copolymers of this invention may be used in conjunction with other rubbers to form the elastomeric component of a tire stock. These other rubbers may include natural rubber, synthetic rubber, or both. Examples of synthetic rubber include synthetic poly(isoprene), poly(styrene-co-butadiene), poly(butadiene), poly(styrene-co-butadiene-co-isoprene) and mixtures thereof.

Reinforcing fillers may include both organic and inorganic fillers. Organic fillers include, but are not limited to carbon black, and inorganic fillers include, but are not limited to, silica, alumina, aluminum hydroxide, and magnesium hydroxide. Reinforcing fillers are typically employed in an amount from about 1 to about 100 parts by weight per 100 parts by weight rubber (phr), and preferably from about 20 to about 80 parts by weight phr, and more preferably from about 40 to about 80 parts by weight phr based on the total weight of all reinforcing fillers employed. Typically, when an inorganic filler is used, it is used in combination with organic fillers. In these embodiments, the total amount of reinforcing filler will include from about 30 to about 99 parts by weight inorganic filler and 1 to about 70 parts by weight organic filler, based on 100 parts by weight total filler. More preferably, the total filler will include from about 50 to about 95 parts by weight inorganic filler and from about 5 to about 50 parts by weight organic filler based on 100 parts by weight filler.

Carbon blacks may include any commonly available carbon black, but those having a surface area (EMSA) of at least 20 $m^2$/g, and more preferably at least 35 $m^2$/g up to 200 $m^2$/g or higher, are preferred. Surface area values used in this application are those determined by ASTM test D-1765 by using the cetyltrimethyl-ammonium bromide (CTAB) technique.

Silicas (silicon dioxide) are generally referred to as wet-process, hydrated silicas because they are produced by a chemical reaction in water, and precipitated as ultrafine, spherical particles. These particles strongly associate into aggregates that in turn combine less strongly into agglomerates. The surface area, as measured by the BET method, gives the best measure of the reinforcing character of different silicas. Useful silicas preferably have a surface area of about 32 to about 400 m²/g, preferably about 100 to about 250 m²/g, and more preferably about 150 to about 220 m²/g. The pH of the silica filler is generally about 5.5 to about 7 and preferably about 5.5 to about 6.8. Commercially available silicas include Hi-Sil™ 215, Hi-Sil™ 233, and Hi-Sil™ 190 (PPG Industries; Pittsburgh, Pa.). Useful commercial grades of different silicas are also available from other sources including Rhone Poulenc.

Typically, a coupling agent is added when silica is used. One coupling agent conventionally used is bis-[3 (triethoxysilyl) propyl]-tetrasulfide, which is commercially available under the tradename SI69 (Degussa, Inc.; New York, N.Y.) Additional coupling agents may include bis(3-(triethoxysilyl)propyl) trisulfide, bis(3-(triethoxysilyl) propyl) disulfide, 3-mercaptopropyltriethoxysilane, bis (3-(trimethoxysilyl)propyl) tetrasulfide, bis (3-(trimethoxysilyl) propyl) trisulfide, bis(3-(trimethoxysilyl) propyl) disulfide, 3-mercaptopropyltrimethoxysilane, 3-(trimethoxysilyl) propyl) diethylthiocarbamyl tetrasulfide, and 3-(trimethoxysilyl)propyl)benzothiazyl tetrasulfide. These agents are typically employed in an amount from about 1 to about 20 phr, and more preferably from about 3 to about 15 phr. Advantageously, less coupling agent is required when the functionalized polymers of this invention, which include a silane functionality, are employed.

Reinforced rubber compounds can be cured in a conventional manner with known vulcanizing agents. For example, sulfur or peroxide-based curing systems may be employed. For a general disclosure of suitable vulcanizing agents one can refer to Kirk-Othmer, ENCYCLOPEDIA OF CHEMICAL TECHNOLOGY, 3$^{rd}$ Edition, Wiley Interscience, N.Y. 1982, Vol. 20, pp. 365–468, particularly VULCANIZATION AGENTS AND AUXILIARY MATERIALS pp. 390–402, or Vulcanization by A. Y. Coran, ENCYCLOPEDIA OF POLYMER SCIENCE AND ENGINEERING, 2$^{nd}$ Edition, John Wiley & Sons, Inc., 1989. Vulcanizing agents may be used alone or in combination. This invention does not appreciably affect cure times. Typically, vulcanization is effected by heating the vulcanizable composition; e.g., it is heated to about 170° C. Cured or crosslinked polymers may be referred to as vulcanizates.

Tire formulations are compounded by using mixing equipment and procedures conventionally employed in the art. Preferably, an initial masterbatch is prepared that includes the elastomer component and the reinforcing fillers, as well as other optional additives such as processing oil and antioxidants. The polyolefin additives are preferably added during preparation of the initial masterbatch. Once this initial masterbatch is prepared, the vulcanizing agents are blended into the composition. The composition can then be processed into tire components according to ordinary tire manufacturing techniques including standard rubber curing techniques. Rubber compounding techniques and the additives employed therein are generally known as disclose in *The Compounding and Vulcanization of Rubber,* by Stevens in RUBBER TECHNOLOGY SECOND EDITION (1973 Van Nostrand Reihold Company). Pneumatic tires can be made according to U.S. Pat. Nos. 5,866,171; 5,876,527; 5,931,211; and 5,971,046, which are incorporated herein by reference.

The copolymers of this invention can also be used in the manufacture of hoses, belts, shoe soles, window seals, other seals, vibration damping rubber, and other industrial products.

In order to demonstrate the practice of the present invention, the following examples have been prepared and tested. The examples should not, however, be viewed as limiting the scope of the invention. The claims will serve to define the invention.

EXAMPLES

Example 1

Seed Polymer Preparation

To glass bottles equipped with rubber septa and crown caps (dried and purged with N2), a mixture of 1,3-butadiene monomer and hexanes were charged so that 30 g of butadiene as 18wt % solution in hexane were made up in each bottle. An anionic polymerization initiator package was charged as shown in Table I (charging order: amine-Li-randomizer) and polymerized for 150 minutes in 50C. bath. Designated terminators were charged and further reacted for 30 min at 50C. Obtained seed polymer solutions were stored in refrigerator at 5° C. for later use. After 15 hours of storage, 1–3 through 1–6 showed cloudiness, while the rest remained clear in solution.

TABLE I

| | Initiator recipe (mmol) | | | Polymerization | | Terminator | |
|---|---|---|---|---|---|---|---|
| Examples | nBuLi | amine (*1) | randomizer (*2) | temp. (C) | time (min) | type | amount (mmol) |
| 1-1 | 9.00 | 0.00 | 0.09 | 50 | 150 | none | 0.00 |
| 1-2 | 9.00 | 8.91 | 0.09 | 50 | 150 | none | 0.00 |
| 1-3 | 9.00 | 0.00 | 0.09 | 50 | 150 | DEAC (*3) | 8.82 |
| 1-4 | 9.00 | 8.91 | 0.09 | 50 | 150 | DEAC (*3) | 8.82 |
| 1-5 | 9.00 | 0.00 | 0.09 | 50 | 150 | EADC (*4) | 4.41 |
| 1-6 | 9.00 | 8.91 | 0.09 | 50 | 150 | EADC (*4) | 4.41 |
| 1-7 | 9.00 | 0.00 | 0.09 | 50 | 150 | isopropanol | 8.82 |
| 1-8 | 9.00 | 8.91 | 0.09 | 50 | 150 | isopropanol | 8.82 |

*1: hexamethyleneimine as hexane solution
*2: 1,3-di-2-oxolanylpropane as hexane solution
*3: diethylaluminum chloride as hexane solution
*4: ethylaluminum dichloride as hexane solution

Example 2

Preparation of Catalyst Mixture (I)

To a glass bottle (dried and N2-purged), following ingredients were added in this order: 2.9 g of 27.7 wt % mixture of 1,3-butadiene in hexanes, 0.5 mmol of Neodymium versatate as hexane solution, 10 mmol of triisobutylaluminum as hexane solution, and 1.375 mmol of diethylaluminum chloride as hexane solution.

After blending all components, the mixture was used in polymerization of Example 4 after 20 minutes of storage at room temperature. The neodymium concentration was calculated from the recipe (0.023M).

Example 3

Preparation of Catalyst Mixture (II)

To a glass bottle (dried and N2-purged), following ingredients were added in this order: 1.7 g of 28 wt % mixture of 1,3-butadiene in hexanes, 0.3 mmol of Neodymium versatate as hexane solution, 30 mmol of MAO as toluene solution, 6.3 mmol of diisobutylaluminum hydride as hexane solution, and 1.2 mmol of diethylaluminum chloride as hexane solution.

After blending all components, the mixture was used in polymerization of Example 4 after 25 minutes of storage at room temperature. The neodymium concentration was calculated from the recipe (0.017M).

Example 4

Coordination Polymerizations

To a glass bottle equipped with rubber septum and crown cap (dried and N2-purged), a 1,3-butadiene solution of hexanes and hexanes were added (10 g as butadiene, final butadiene concentration: 15 wt %). Additive was added as set forth in Table II. When the additive is seed polymer solution (Ex. 1-1~8), the added amount of the solution contains 0.5 g of the seed polymer. A few minutes after the addition of the additives, the catalyst mixture (I) (0.019 mmol as Nd) or the catalyst mixture (II) (0.006 mmol as Nd) was added. The bottles were tumbled in 50C. bath for 120 min (Catalyst (I)) or for 60 min (Catalyst (II)), then quenched with isopropanol (0.5 ml). Polymers were recovered by cast drying and successive vacuum oven drying at 50C. for 4 hrs.

TABLE II

| | Additives | | Catalyst mixture | | |
|---|---|---|---|---|---|
| Examples | type | amount (eq/Nd) (*1) | type | amount (mmol as Nd) | polymerization time (min) |
| 4-1 | Ex. 1-1 | 25 | (I) | 0.019 | 120 |
| 4-2 | Ex. 1-2 | 25 | (I) | 0.019 | 120 |
| 4-3 | Ex. 1-3 | 25 | (I) | 0.019 | 120 |
| 4-4 | Ex. 1-4 | 25 | (I) | 0.019 | 120 |
| 4-5 | Ex. 1-5 | 25 | (I) | 0.019 | 120 |
| 4-6 | Ex. 1-6 | 25 | (I) | 0.019 | 120 |
| 4-7 | Ex. 1-7 | 25 | (I) | 0.019 | 120 |
| 4-8 | Ex. 1-8 | 25 | (I) | 0.019 | 120 |
| 4-9 | TIBA (*2) | 25 | (I) | 0.019 | 120 |
| 4-10 | none | 0 | (I) | 0.019 | 120 |
| 4-11 | Ex. 1-1 | 25 | (II) | 0.006 | 60 |
| 4-12 | Ex. 1-2 | 25 | (II) | 0.006 | 60 |
| 4-13 | Ex. 1-3 | 25 | (II) | 0.006 | 60 |
| 4-14 | Ex. 1-4 | 25 | (II) | 0.006 | 60 |
| 4-15 | Ex. 1-5 | 25 | (II) | 0.006 | 60 |
| 4-16 | Ex. 1-6 | 25 | (II) | 0.006 | 60 |
| 4-17 | Ex. 1-7 | 25 | (II) | 0.006 | 60 |
| 4-18 | Ex. 1-8 | 25 | (II) | 0.006 | 60 |
| 4-19 | TIBA (*2) | 25 | (II) | 0.006 | 60 |
| 4-20 | none | 0 | (II) | 0.006 | 60 |

| | Results | | | | | |
|---|---|---|---|---|---|---|
| Examples | yield (%) | Mn kg/mol | Mw/Mn | area % of free seed polymer | Incorporation efficiency (%) | Amine functionality (%) |
| 4-1 | 0 | | | | | |
| 4-2 | 0 | | | | | |
| 4-3 | 88 | 68.5 | 4.01 | 0.85 | 83 | 0.0 |
| 4-4 | 75 | 69.4 | 4.73 | 0.69 | 88 | 32.6 |
| 4-5 | 87 | 81.9 | 3.85 | 1.20 | 76 | |
| 4-6 | 66 | 95.4 | 4.69 | 2.23 | 67 | |
| 4-7 | 0 | | | | | |
| 4-8 | 0 | | | | | |
| 4-9 | 87 | 217 | 2.66 | 0 | | |
| 4-10 | 18 | 179 | 5.63 | 0 | | |
| 4-11 | trace | | | | | |
| 4-12 | 0 | | | | | |
| 4-13 | 96 | 64.2 | 2.52 | 1.24 | 75 | 0.0 |
| 4-14 | 99 | 62.1 | 2.34 | 0.60 | 88 | 37.4 |
| 4-15 | 97 | 71.8 | 2.15 | 1.64 | 67 | |
| 4-16 | 94 | 66.5 | 2.63 | 1.27 | 75 | |
| 4-17 | 0 | | | | | |
| 4-18 | 0 | | | | | |
| 4-19 | 94 | 128 | 2.19 | 0 | | |
| 4-20 | 92 | 157 | 2.06 | 0 | | |

*1: Amounts of seed polymers (Ex. 1-1~8) were calculated based on their original Li amounts.
*2: triisobutylaluminum as hexane solution The incorporation efficiency of the seed polymer to the polymer segment prepared by coordination catalysis was calculated from GPC area ratios by manual peak separation, and the expected weight ratios if no incorporation took place. The GPC employed was a Tosoh HPLC8010 (column: Tosoh GMHXL×2, mobile phase: THF 1 ml/min, refractive index detector. The amine functionality percent, which is the weight percent of the final copolymer that contains amine functionality, was obtained by peak area ratios of the polymer separated by HPLC.

Various modifications and alterations that do not depart from the scope and spirit of this invention will become apparent to those skilled in the art. This invention is not to be duly limited to the illustrative embodiments set forth herein.

What is claimed is:

1. A process for forming a copolymer comprising the steps of:
   (i) preparing a living polymer segment by using an anionic polymerization technique;
   (ii) modifying the living polymer by reacting it with an alkyl metal halide to form an organometallic polymeric intermediate; and
   (iii) preparing a second polymer segment from the organometallic polymeric intermediate by combining the intermediate, conjugated diene monomer, and a coordination catalyst system that will polymerize the conjugated diene monomer.

2. The process of claim 1, where the anionic polymerization techniques include the use of an alkyllithium compound to polymerize conjugated dienes or conjugated dienes in combination with vinyl aromatic monomer.

3. The process of claim 2, where the amount of alkyl metal halide reacted with the living polymer corresponds to 1 milliequivalent of halide of the alkyl metal halide per 1 milliequivalent of lithium of the living polymer, and where the milliequivalent ratio does not vary by more than 10%.

4. The process of claim 1, where the organometallic polymeric intermediate is allowed to age for at least 12 hours prior to preparing the second polymer.

5. The process of claim 4, where the organometallic polymeric intermediate is allowed to age for at least 24 hours prior to preparing the second polymer.

6. The process of claim 1, where the coordination catalyst system is formed by combining a lanthanide compound, an alkylating agent, and a source of halogen.

7. The process of claim 6, where the monomer and the intermediate are combined prior to combining them with the catalyst system.

8. The process of claim 1, further comprising the step of quenching the second polymer segment.

9. The process of claim 1, where the alkyl metal halide is an alkyl aluminum halide.

10. The process of claim 8, where said quenching emplys a functionalizing agent.

11. The process of claim 1, further comprising the step of isolating the copolymer and comgining the copolymer with sililca to form a filled rubber composition.

12. The process of claim 11, further comprising the step of fabricating the filled rubber composition into a tire.

13. A process for forming a copolymer comprising the steps of:
    (i) providing a living polymer;
    (ii) reacting the living polymer with an alkyl metal halide to form an organometallic polymeric intermediate;
    (iii) aging the organometallic polymeric intermediate for at least 12 hours to form an aged intermediate;
    (iv) combining the aged intermediate with monomer to form a blend; and
    (v) combining the blend with a coordination catalyst system to form a copolymer.

14. The process of claim 13, further comprising the step of terminating the copolymer with a functionalizing agent.

15. The process of claim 14, where the functionalizing agent is an epoxy, ester, imine, isocyanate, isothiocyanate, ketone, or imide.

16. The process of cliam 13, where the living polymer includes polymeric segments that derive from 1,3-butadiene.

17. The process of claim 16, where the monomer includes 1,3-butadiene.

18. A copolymer prepared by:
    (i) preparing a living polymer segment by using an anionic polymerization technique;
    (ii) modifying the living polymer by reacting it with an alkyl metal halide to form an organometallic polymeric intermediate; and
    (iii) preparing a second polymer segment from the organometallic polymeric intermediate by combining the intermediate, conjugated diene monomer, and a coordination catalyst system that will polymerize the conjugated diene monomer.

19. The copolymer of claim 18, where the amount of alkyl metal halide reacted with the living polymer corresponds to 1 milliequivalent of halide of the alkyl metal halide per 1 milliequivalent of lithium of the living polymer, where the milliequivalent ratio does not vary by more than 10%, and where the organometallic polymeric intermediate is allowed to age for at least 12 hours prior to preparing the seond polymer.

20. The copolymer of claim 19, further comprising the step of terminating the copolymer with a functionalizing agent, and where the functionalizing agent is an epoxy, ester, imine, isocyanate, isothiocyanate, ketone, or imide.

* * * * *

UNITED STATES PATENT AND TRADEMARK OFFICE
CERTIFICATE OF CORRECTION

PATENT NO.  : 6,765,066 B2
DATED       : July 20, 2004
INVENTOR(S) : Yoichi Ozawa It is certified that error appears in the above-identified patent and that said Letters Patent is hereby corrected as shown below:

Column 12,
Line 1, "emplys" should be -- employs --;
Line 4, "comgining" should be -- combining --.

Signed and Sealed this

Eighth Day of February, 2005

JON W. DUDAS
*Director of the United States Patent and Trademark Office*